(12) United States Patent
Brierley et al.

(10) Patent No.: US 7,514,050 B2
(45) Date of Patent: Apr. 7, 2009

(54) PROCESSING OF ACID-CONSUMING MINERAL MATERIALS INVOLVING TREATMENT WITH ACIDIC BIOOXIDATION EFFLUENT

(75) Inventors: James A. Brierley, Highlands Ranch, CO (US); Fritz-Peter Sawyer, Spring Creek, NV (US)

(73) Assignee: Newmont USA Limited, Denver, CO (US)

( * ) Notice: Subject to any disclaimer, the term of this patent is extended or adjusted under 35 U.S.C. 154(b) by 651 days.

(21) Appl. No.: 11/146,250

(22) Filed: Jun. 6, 2005

(65) Prior Publication Data

US 2006/0002834 A1 Jan. 5, 2006

Related U.S. Application Data

(60) Provisional application No. 60/584,602, filed on Jul. 1, 2004.

(51) Int. Cl.
*C22B 3/00* (2006.01)
(52) U.S. Cl. .................. 423/27; 423/109; 423/150.1; 423/DIG. 17
(58) Field of Classification Search .............. 423/27, 423/109, 150.1, DIG. 17
See application file for complete search history.

(56) References Cited

U.S. PATENT DOCUMENTS

| | | | | |
|---|---|---|---|---|
| 3,272,621 | A | * | 9/1966 | Zajic ........................... 435/262 |
| 3,330,650 | A | * | 7/1967 | Malouf et al. ................. 75/373 |
| 4,690,894 | A | | 9/1987 | Brierley et al. ............... 435/244 |
| 4,729,788 | A | | 3/1988 | Hutchins et al. ........... 75/118 R |
| 4,789,481 | A | | 12/1988 | Brierley et al. ............... 210/661 |
| 4,898,827 | A | | 2/1990 | Brierley et al. ............... 435/244 |
| 4,992,179 | A | | 2/1991 | Brierley et al. ............... 210/661 |
| 5,127,942 | A | | 7/1992 | Brierley et al. ................. 75/743 |
| 5,244,493 | A | | 9/1993 | Brierley et al. ................. 75/743 |
| 5,246,486 | A | | 9/1993 | Brierley et al. ................. 75/743 |
| 5,332,559 | A | | 7/1994 | Brierley et al. ................. 423/27 |
| 5,626,648 | A | * | 5/1997 | Duyvesteyn et al. ........... 75/712 |
| 5,688,304 | A | | 11/1997 | Kohr et al. ..................... 75/712 |
| 5,779,762 | A | | 7/1998 | Kohr et al. ..................... 75/712 |
| 5,834,294 | A | | 11/1998 | Brierley et al. ............... 435/243 |
| 5,914,441 | A | | 6/1999 | Hunter et al. .................. 75/712 |
| 6,107,065 | A | * | 8/2000 | Kohr ........................... 435/168 |
| 6,159,726 | A | | 12/2000 | Kohr ........................... 435/262 |
| 6,383,458 | B1 | | 5/2002 | Brierley et al. ................. 423/23 |
| 6,696,283 | B1 | | 2/2004 | Brierley et al. ............... 435/262 |

FOREIGN PATENT DOCUMENTS

EP 522 798 A1 1/1993

OTHER PUBLICATIONS

Carranza, F. et al. 1999. "Process options in the treatment of a mixed atacamite, secondary copper sulphides mineral. Heap leaching and BRISA process." In R. Amils and A. Ballester (eds.) Biohydrometallurgy and the Environment Toward the Mining of the 21$^{st}$ Century. Elsevier, New York, pp. 511-520.

Kelly, D.P. et al. 1979. "Microbiological methods for the extraction and recovery of metals." In A.T. Bull, D.C. Ellwood and C. Ratledge (eds.). Microbial Technology: Current State, Future Prospects. Cambridge University Press, London, pp. 263-308.

Grishin, S.I. and Tuovinen, O.H. 1988. "Fast Kinetics of Fe$^{2+}$ Oxidation in Packed-Bed Reactors." Applied and Environmental Microbiology. vol. 54, No. 12. pp. 3092-3100.

Mazuelos, A. et al. 1999. Continuous Ferrous Iron Biooxidation In Flooded Packed Bed Reactors. Technical Note. Minerals Engineering. vol. 12, No. 5. pp. 559-564.

Neira, M.P. et al. "Bio-Reactor Development For Ferrous To Ferric Conversion" 1997. SME Annual Meeting. Preprint 97-89. Society For Mining, Metallurgy And Exploration, Inc. pp. 1-7.

Livesey-Goldblatt, E. et al. 1977. "Pilot-plant bacterial film oxidation (BACFOX Process) of recycled acidified uranium plant ferrous sulphate leach solution." Conference Bacterial Leaching 1977. GBF Mongraph Series, No. 4: pp. 175-190.

Jo, M. et al. 1991. "Bacterial thin layer leaching of copper sulphide ones." In: W.C. Copper, D.J. Kemp, G.E. Lagos and K.G. Tan (Eds.), Hydrometallurgy and Electrometallurgy of Copper. Pergamon Press, New York, pp. 87-97.

* cited by examiner

*Primary Examiner*—Steven Bos
(74) *Attorney, Agent, or Firm*—Marsh Fischmann & Breyfogle LLP

(57) ABSTRACT

In one aspect the present invention provides a method of recovering gold from each of at least two different refractory gold-bearing sulfidic mineral materials. A first mineral material is subjected to biooxidation pretreatment to release gold locked within sulfide minerals. The biooxidation produces an acidic biooxidation liquor effluent that contains significant dissolved iron in the ferric form. All or a portion of the biooxidation liquor effluent is used as an acidic treatment liquid to treat the second mineral material, which contains acid-consuming minerals. During the treatment, acid-consuming minerals react with the acidic solution, raising solution pH and resulting in reduced solubility and precipitation of dissolved iron and other metals. Also during the treating, sulfides in the second mineral material or oxidized, thereby releasing gold for subsequent recovery.

60 Claims, 3 Drawing Sheets

PROCESSING OF ACID-CONSUMING MINERAL MATERIALS INVOLVING TREATMENT WITH ACIDIC BIOOXIDATION EFFLUENT

CROSS-REFERENCE TO RELATED APPLICATIONS

This application claims priority to U.S. Provisional Patent Application No. 60/584,602, filed Jul. 1, 2004, the entire contents of which are incorporated by reference herein as if set forth herein in full.

FIELD OF THE INVENTION

The present invention relates primarily to recovery of gold from sulfidic refractory mineral materials, with a preferred application involving the processing of different sulfidic refractory mineral materials, with one of the mineral materials being subjected to biooxidation and another of the mineral materials having a significant acid-consuming mineral content and being treated with biooxidation liquor effluent.

BACKGROUND OF THE INVENTION

Some gold-bearing sulfide ores are refractory to gold recovery because all or a significant portion of the gold is locked within sulfide minerals. Consequently, these ores, or concentrates made from such ores, are often subjected to a pretreatment process before leaching the gold with a leach solution containing cyanide or some other gold lixiviant. Such pretreatment processes generally involve oxidization of sulfide sulfur contained in the sulfide minerals, thereby decomposing the sulfide minerals and releasing gold for recovery.

One pretreatment process is biooxidation. Biooxidation pretreatment involves the use of iron-oxidizing acidophilic microorganisms to promote oxidation of the sulfide minerals in which gold is locked, releasing the gold for recovery. Biooxidation pretreatment may be performed in heaps, vats, tanks, or other reactor systems.

Acidophilic microorganisms used during biooxidation pretreatment thrive in a highly acidic environment, and the effectiveness of the biooxidation pretreatment partly depends on an ability to maintain suitable highly acidic conditions in the reactor system to promote growth of the microorganisms. Some gold sulfide ores, however, contain a significant amount of acid-consuming minerals, and particularly acid-consuming carbonate minerals such as for example calcite and/or dolomite. These acid-consuming components tend to react with and neutralize available acid, which can seriously interfere with establishment and maintenance of desired acidic conditions conducive to microbial growth for effective biooxidation pretreatment.

A biooxidation pretreatment operation may be able to accommodate acid consumption associated with a low concentration of acid-consuming components, but as the concentration of acid-consuming minerals increases, it may become necessary to preacidify an ore material, such as by the addition of sulfuric acid, prior to conducting the biooxidation pretreatment. Another possibility is to attempt to physically remove acid-consuming components prior to the biooxidation pretreatment. For example, an ore might be subjected to flotation in an attempt to prepare a sulfide concentrate that is largely free of acid-consuming components. Because of the substantial costs associated with pre-acidification and flotation operations, however, those techniques are often not economically feasible for treating ore materials with lower gold grades.

SUMMARY OF THE INVENTION

It has been recognized by the inventors that excess biooxidation liquor effluent from biooxidation pretreatment of one gold-containing sulfidic mineral material can be used to beneficially treat another gold-containing sulfidic mineral material that contains acid-consuming components. The first mineral material, which is subjected to biooxidation pretreatment, typically is more amenable to biooxidation as a pretreatment option. For example, the first mineral material may have a lower concentration of acid-consuming components and/or may benefit from a higher gold content, so that the cost of performing biooxidation pretreatment is justifiable. The second mineral material, which is treated with biooxidation liquor effluent, typically is less amenable to biooxidation pretreatment, for example because of a significant concentration of acid-consuming components, but without a gold content that is high enough to justify the expense that would be associated with biooxidation pretreatment.

During the treatment of the second mineral material with biooxidation liquor effluent, acid in the biooxidation liquor effluent is neutralized through reaction with acid-consuming components of the second mineral material, resulting in an increase in solution pH and precipitation of dissolved iron and other metals from the biooxidation liquor effluent. The acid neutralization and metal precipitation beneficially reduce water treatment that would otherwise be required in connection with operation of the biooxidation pretreatment performed on the first mineral material. Surprisingly, there is also a significant oxidation and associated decomposition of sulfide minerals, resulting in release of gold from the second mineral material, and such released gold is thereby made available for recovery. By release of the gold it is meant exposing, liberating or otherwise making the gold available for recovery by leaching.

The mechanism for oxidation of sulfide minerals in the second mineral material is believed to be similar to that occurring during biooxidation. As an example, reactions represented by the following equations are believed to be involved with biooxidation of pyrite ($FeS_2$):

$$FeS_2 + 7Fe_2(SO_4)_3 + 8H_2O \rightarrow 15FeSO_4 + 8H_2SO_4 \qquad \text{I}$$

$$15FeSO_4 + 3\tfrac{3}{4}O_2 + 7\tfrac{1}{2}H_2SO_4 \rightarrow 7\tfrac{1}{2}Fe_2(SO_4)_3 + 7\tfrac{1}{2}H_2O \qquad \text{II}$$

In the reaction of equation I, pyrite is oxidized in the presence of ferric sulfate and water. The pyrite reacts with ferric sulfate and water to generate ferrous sulfate and sulfuric acid. Ferric iron acts as an oxidant to oxidize the pyrite, and is correspondingly reduced to the ferrous form as the pyrite is oxidized. The reaction of equation II involves microbial oxidation by iron-oxidizing acidophilic bacteria of ferrous iron to the ferric form, which is then available for use as an oxidant in the reaction of equation I. In the reaction of equation II, ferrous sulfate reacts with bacteria, oxygen and sulfuric acid to generate ferric sulfate and water. Equation III below shows the net effect of combining equations I and II:

$$FeS_2 + 3\tfrac{3}{4}O_2 + \tfrac{1}{2}H_2O \rightarrow \tfrac{1}{2}Fe_2(SO_4)_3 + \tfrac{1}{2}H_2SO_4 \qquad \text{III}$$

From equation III, it is seen that excess sulfuric acid and ferric sulfate are generated during biooxidation pretreatment. To avoid a detrimental buildup of acid and dissolved iron, one practice has been to treat all or a portion of biooxidation liquor effluent to reduce dissolved iron and acid levels prior to recycle to the biooxidation pretreatment.

With the invention, at least a portion of these excess quantities of acid and ferric iron are instead beneficially used to treat the second mineral material. As noted, during treatment of the second mineral material, acid levels are reduced through neutralization reactions with acid-consuming minerals and the corresponding increase in solution pH causes precipitation of dissolved metals, thereby beneficially treating the biooxidation liquor effluent. In some situations, liquid effluent collected from the treatment operation may be sufficiently treated for reuse as process water, in either the biooxidation pretreatment of the first mineral material or in other operations. Also, the liquid effluent collected from the treatment operation may be subjected to further water treatment, depending upon the level of water quality that is desired.

In addition to the water treatment benefit obtained by treatment of the second mineral material, significant oxidation of sulfide minerals in the second mineral material results in exposure of gold in the second mineral material that can then be recovered by leaching the solids with a leach solution containing a lixiviant for the gold, such as for example, cyanide, thiosulfate or thiocyanate lixiviant, or combinations, thereof. This result is surprising, because it appears that at least a significant portion of the ferric iron in the biooxidation liquor effluent is available to oxidize sulfide minerals in the second mineral material, despite neutralization of the solution that is occurring by reaction with acid-consuming minerals, which neutralization also promotes precipitation of dissolved iron and other dissolved metals. Also, the oxidation of sulfide minerals in the second mineral material may be aided by microbial action occurring on a micro-scale in the vicinity of iron-containing sulfide mineral grains. Although, the presence of the acid-consuming minerals tends to neutralize acid and prevent effective acidification of the second mineral material on a macro-scale, on a micro-scale some microbes in the biooxidation liquor effluent may associate with micro-domains of sulfide mineralization, and microbial action in these micro-domains may be sufficient to promote a self-sustaining acidic micro-environment in the vicinity of the sulfide mineralization with associated oxidation of sulfide minerals, such as according to equations I and II above.

In one aspect, the present invention provides a method for processing, as part of gold recovery operations, two different mineral materials in which at least a portion of the gold in each is locked in sulfide minerals. The method involves biooxidizing a first such mineral material comprising gold locked within sulfide minerals. The biooxidation involves contacting the first mineral material with acidic biooxidation liquor in the presence of iron-oxidizing acidophilic microorganisms to decompose sulfide minerals and release the gold for recovery. During the biooxidation, iron from decomposed iron-containing sulfide minerals becomes dissolved in the biooxidation liquor, primarily in the form of ferric ions due to microbial action. Effluent of the biooxidizing liquor collected from the biooxidation, therefore, has a higher concentration of total dissolved iron, including a higher concentration of dissolved ferric iron, and is more acidic than feed of the biooxidation liquor supplied to the process. A second such mineral material is subjected to treating with an acidic treating solution that is comprised at least partially, and preferably substantially entirely, of effluent of the biooxidation liquor obtained from biooxidizing of the first mineral materials component. The second mineral material comprises gold locked within sulfide minerals, and also comprises one or more acid-consuming mineral. During the treating, sulfide minerals in the second mineral material are oxidized using ferric iron of the biooxidation liquor effluent as an oxidant. The sulfide minerals are thereby decomposed, and gold is released for recovery from the second mineral material. Also during the treating, the acid-consuming minerals in the second mineral material react with and neutralize acid from the biooxidation liquor effluent, thereby increasing the pH of the treating solution. The increased pH is accompanied by precipitation of dissolved metals, including iron, from the treating solution. A treated effluent of the treating solution exiting the treating operation generally has a higher pH and lower concentrations of dissolved iron and other metals relative to feed of the treating solution that was supplied to the treating. Following the biooxidizing of the first mineral material, the gold may be leached from the solid residue resulting from the biooxidation. Likewise, after the treating of the second mineral material, gold may be leached from the solid residue resulting from the treating.

In another aspect, the present invention provides a method for processing gold-containing sulfide mineral material that also has a significant acid-consuming capacity, such as for example because of the presence of a significant quantity of acid-consuming carbonate minerals and/or other acid-consuming mineral components. The method involves treating the mineral material with an acidic treatment liquid comprising effluent of biooxidation liquor obtained from biooxidation of a different mineral material, which may or may not also contain gold locked in sulfide minerals. Following the treating, the residual solids resulting from the treating may then be leached to dissolve gold.

In yet another aspect, the present invention provides a method involving biooxidizing a gold-containing sulfide mineral material to facilitate gold recovery, and water treatment of biooxidation liquor effluent by contacting all or a portion of the biooxidation liquor effluent with another mineral material that has a significant acid-consuming capacity, such as for example because of the presence of a significant quantity of acid-consuming carbonate minerals and/or other acid-consuming mineral components.

Yet other aspects of the invention provide methods involving biooxidation of a nonferrous base metal-containing sulfide mineral material and/or involving treating a nonferrous base metal-containing sulfide mineral material, for the recovery of the nonferrous base metal. The mineral material(s) subjected to biooxidation and/or treatment with biooxidation liquor effluent may or may not contain a recoverable quantity of gold. In one variation, nonferrous base metal is released during the biooxidation and is recovered by leaching, such as into the biooxidation liquor and/or into a separate leach solution in a leach step following the biooxidation. In another variation, nonferrous base metal-containing sulfide mineral material is treated with biooxidation liquor effluent from a separate biooxidation operation on a different mineral material, which may contain recoverable quantities of one or more nonferrous base metal and/or gold.

DETAILED DESCRIPTION OF PREFERRED EMBODIMENTS

The present invention may be used to process two different mineral materials comprising sulfide minerals, with at least one of the mineral materials comprising a significant acid-consuming capacity, such as may be due to the presence of significant quantities of carbonate minerals. Each of the mineral materials may be gold-containing mineral materials in which some or all of the gold content is contained in sulfide minerals. The invention is described in detail herein primarily with reference to refractory sulfide gold ore as the mineral material being processed. The same principles also apply, however, to processing other types of mineral materials comprising gold contained in sulfide minerals. For example, mineral material processed according to the invention may be a gold-bearing sulfide ore, a sulfide concentrate prepared from such an ore (such as by flotation or another concentration technique), a tailing or other solid residue from a prior mineral processing operation of such an ore, a blend of ores, or a combination in any proportions including any number of the foregoing with or without the presence also of other components.

Figure 1:
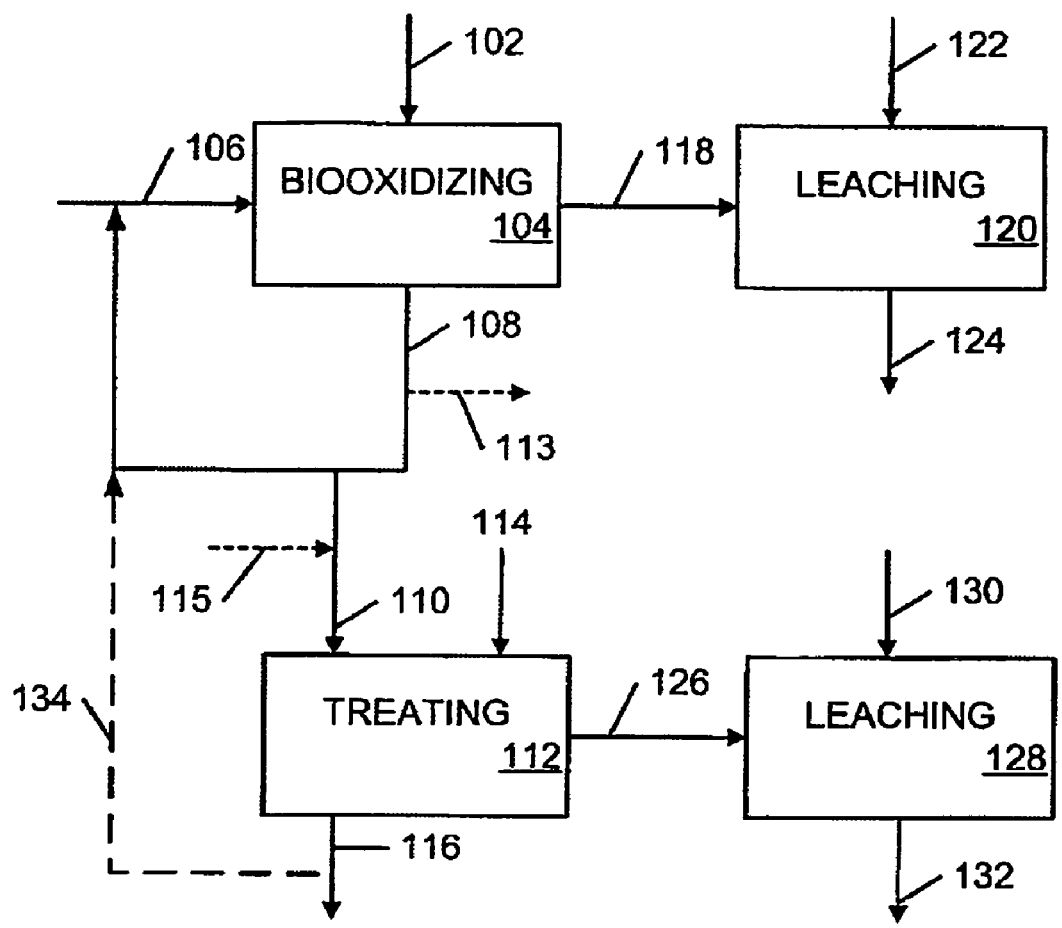
FIG. 1 is a generalized process block diagram illustrating an embodiment for implementation of the invention.

With the invention, gold-containing sulfide mineral materials having a significant acid-consuming capacity may be beneficially treated to improve gold recovery. Referring now to FIG. 1, a generalized process block diagram is shown for one embodiment for implementation of the invention involving treatment of two different mineral materials, each containing gold contained in sulfide minerals and with at least one having a significant acid-consuming capacity. As shown in FIG. 1, a first mineral material 102 is subjected to biooxidizing 104 in the presence of a biooxidation liquor. The first mineral material 102 is exemplified for discussion purposes as a refractory sulfide gold ore containing gold locked within sulfide minerals. During the biooxidizing 104 an acidic feed of the biooxidation liquor 106 is supplied to the biooxidizing 104 to contact the first mineral material 102. For example, the feed of the biooxidation liquor 106 may be an acidic sulfate solution with a pH of about 2.5 or smaller (and preferably a pH in a range of from pH 1.6 to pH 2.0), total dissolved iron concentration in a range of from 5 to 70 g/L, dissolved ferric iron concentration also in a range of from 5 to 70 g/L (most and preferably substantially all dissolved iron should typically be in the ferric form) and oxidation potential of from +500 mV to +700 mV (as measured relative to a silver/silver chloride electrode). The biooxidizing 104 is conducted with the first mineral material 102 in the presence of iron-oxidizing acidophilic microorganism(s), and typically the feed of the biooxidation liquor 106 will contain one or more such microorganism(s).

As the biooxidizing 104 continues, the microorganisms oxidize ferrous iron in the biooxidation liquor to ferric iron, and the ferric iron acts as an oxidant to oxidize and thereby decompose sulfide minerals of the first mineral material 102, resulting in release of gold for subsequent recovery. Often at least 20 percent, preferably at least 40 percent and more preferably at least 50 percent of sulfide sulfur contained in the first mineral material 102 is oxidized during the biooxidizing 104. Effluent of the biooxidation liquor 108 from the biooxidizing 104 is typically more acidic and has a higher concentration of both total dissolved iron and dissolved ferric iron than the feed of the biooxidation liquor 106. For example, the effluent of the biooxidation liquor 108 may be an acidic sulfate solution with a pH of preferably no larger than pH 2.5 (more preferably no larger than pH 2.0, but preferably at least pH 1.0), a concentration of total dissolved iron (and also a concentration of dissolved ferric iron) of at least 5 g/L (preferably in a range of from 5 to 70 g/L, and more preferably in a range of from 10 g/L to 30 g/L) with most or substantially all of the dissolved iron being in the ferric form, and oxidation potential of +600 mV to +700 mV (as measured relative to a silver/silver chloride electrode). The effluent of the biooxidation liquor 108 may also contain in solution other components dissolved from the first mineral material 102 during the biooxidizing 104. For example, the effluent of the biooxidation liquor 108 may contain dissolved metals such as one or more of arsenic, antimony, cadmium, copper and molybdenum, depending upon the nature of the first mineral material 102. A portion, and typically a majority, of the effluent of the biooxidation liquor 108 is recycled for use to prepare the feed of the biooxidation liquor 106. This recycle may involve water treatment of all or a portion of the effluent of the biooxidation liquor 108 to adjust solution properties for use to prepare the feed of the biooxidation liquor 106. Such water treatment may involve, for example, precipitation or other removal of some of the dissolved components and pH adjustment. Make-up liquid and reagents may be added to recycle liquids as needed.

In the embodiment shown in FIG. 1, at least a portion of the effluent of the biooxidation liquor 108 is used to prepare a feed of treating solution 110 that is supplied to a treating 112 operation to treat a second mineral material 114. Optionally, a portion of the effluent of the biooxidation liquor 108 may also be used as an inoculate solution 113 for use to inoculate fresh mineral material being prepared for another biooxidation operation, because the effluent of the biooxidation liquor 108 is rich in the acidophilic iron-oxidizing microorganisms.

Continuing with reference to FIG. 1, the feed of the treating solution 110 is supplied to the treating 112, to contact the second mineral material 114. In addition to a portion of the effluent of the biooxidation liquor 108, the feed of the treating solution 110 may optionally include additions 115 of make-up liquid and/or reagents for adjustment of solution properties. Frequently, however, the feed of the treating solution 110 will be comprised substantially entirely of a portion or all of the effluent of the biooxidation liquor 108. The feed of the treating solution 110 will, therefore, often have the same properties as the effluent of the biooxidation liquor 108, such as for example with respect to pH, dissolved iron and oxidation potential.

The second mineral material 114 is exemplified for discussion purposes as a refractory sulfide gold ore containing gold locked within sulfide minerals. The second mineral material 114 also contains acid-consuming minerals. During the treating 112, the acid in the treating solution reacts with acid-consuming components of the second mineral material 114, thereby neutralizing at least a portion, and preferably a majority or even substantially all, of the acid content in the feed of the treating solution 110. With such acid neutralization, the pH of the treating solution tends to increase during the treating 112, resulting in reduced solubility and precipitation of metals, including iron, from the treating solution. Treated effluent of the treating solution 116 from the treating 112 typically has a pH that is higher and a concentration of total dissolved metal (and a concentration of dissolved iron) that is smaller than the corresponding concentration in the feed of the treating solution 110 supplied to the treating 112.

With respect to changes in the process liquids, the situation during the treating 112 is, therefore, somewhat a reverse of the situation during the biooxidizing 104. During the biooxidizing 104, the biooxidation liquor becomes more acidic and more concentrated in dissolved metals (and in dissolved iron). Conversely, during the treating 112, the treating solution becomes less acidic and less concentrated in dissolved metals (and in dissolved iron). Remarkably, however, even though acid in the treating solution is being neutralized and metals are being precipitated during the treating 112, a significant amount of the gold-containing sulfide minerals of the second mineral material 114 are oxidized, presumably by action of dissolved ferric iron as an oxidant. The effect of the treating 112 is, therefore, to both beneficially treat some or all of the effluent of the biooxidation liquor 108 and to beneficially decompose sulfide minerals in the second mineral material 114 to release gold for recovery.

As shown in FIG. 1, after the biooxidizing 104, residual solids 118 from the biooxidizing 104 are subjected to leaching 120. During the leaching 120, the residual solids 118 are leached with a leach solution to dissolve gold from the residual solids 118 into the leach solution. As shown in FIG. 1, feed of the leach solution 122 is supplied to the leaching 120 to contact the residual solids 118, and pregnant effluent of the leach solution 124, which is loaded with dissolved gold, may be collected and subjected to further processing for recovery of the gold to prepare a purified gold product.

Following the treating 112, residual solids 126 from the treating 112 are subjected to leaching 128. During the leaching 128, the residual solids 126 are leached with a leach solution to dissolve gold from the residual solids 126 into the leach solution. As shown in FIG. 1, feed of the leach solution 130 is supplied to the leaching 128 to contact the residual solids 126. Pregnant effluent of the leach solution 132, which is loaded with dissolved gold, may be collected and subjected to further processing for recovery of gold to prepare a purified gold product.

The feed of the leach solution 122 and the feed of the leach solution 130 each contain a lixiviant for gold. The lixiviant may be the same or different in each of these leach solutions. For example, the leach solution for the leaching 120 and the leaching 128 may each include one or more lixiviant selected from following: cyanide, thiosulfate and thiocyanate lixiviants, and combinations thereof. As will be appreciated, the solids being leached may be conditioned prior to gold leaching. For example, cyanide and thiosulfate leaching each is typically conducted at an alkaline pH, and the pH of the solids will typically be increased by the addition of lime or some other neutralizing agent prior to the gold leach. Some pH modification may also be used in connection with thiocyanate leaching, but thiocyanate leaching may generally be performed under more acidic conditions than either cyanide or thiosulfate leaching.

The leaching 120 and the leaching 128 may each be performed in any suitable reactor system. With reference to the leaching 128, for example, the treating 112 may be performed in a heap, and upon completion of the treating 112 the heap could be removed, and the solids neutralized and re-deposited in a new heap for performing the leaching 128. As another example, the heap could be removed after the treating 112, the solids comminuted to a finer size, and the leaching 128 then performed in stirred tank reactors. For example, the more finely comminuted solids could be subjected to carbon-in-leach or carbon-in-pulp cyanide leaching in stirred tank reactors.

The first mineral material 102 may be any sulfidic mineral material containing gold locked in sulfide minerals and that is amenable to biooxidation. By sulfidic, it is meant that a significant portion of the mineral is comprised of sulfide minerals. The first mineral material 102 may be, for example, in the form of a whole ore, a sulfide concentrate (such as may be prepared by flotation or another concentration process), tailings from other mineral processing operations, a blend of ores, or a combination including in any proportions of any number of the foregoing with or without the presence also of other components. The first mineral material 102 should preferably contain gold in an amount sufficiently large so that biooxidation is an economically feasible pretreatment option. The first mineral material 102 for example, may have a gold content of at least about 0.3 ounce per ton (10.3 grams per tonne), and often at least 0.5 ounce per ton (34.3 grams per tonne). The first mineral material will often, however, have a gold content of no larger than 1.0 ounce per ton (17.2 grams per tonne), and more often not larger than 0.8 ounce per ton (27.5 grams per tonne). The first mineral material 102 typically is refractory to gold recovery due to all or a significant portion of the gold being locked in iron-containing sulfide minerals, such as for example one or more of pyrite, arsenopyrite, marcasite and pyrrhotite. As used herein unless otherwise noted, ton refers to a short ton, ounce refers to a troy once and tonne refers to a metric ton.

Additionally, the acid-consuming mineral content of the first mineral material 102 should not be so large as to render biooxidation pretreatment uneconomic. Often, the first mineral material 102 will have an acid-consuming capacity of not larger than 50 pounds per ton (20.6 kilograms per tonne) and preferably not larger than 25 pounds per ton (10.3 kilograms per tonne). By acid-consuming capacity of a mineral material, it is meant the quantity of sulfuric acid that a unit quantity of the mineral material is capable of consuming through reaction of the sulfuric acid with acid-consuming components of the mineral material. In one preferred embodiment, the first mineral material 102 is essentially free of acid-consuming components. Carbonate-containing minerals, such as for example calcite and/or dolomite, often comprise the majority of the acid-consuming components in gold sulfide ores. Accordingly, the first mineral material 102 will often have substantially no or only a relatively small carbonate content. In one preferred implementation, the first mineral material 102 has a carbonate content of no larger than 2.5 weight percent carbonate, and more preferably no larger than 2 weight percent carbonate, and even more preferably no larger than 1.25 weight percent carbonate.

The biooxidizing 104 of the first mineral material 102 should occur under conditions conducive to effective biooxidation pretreatment of the first mineral material 102. Any reactor system may be used that provides for intimate contact between the biooxidation liquor and the first mineral material 102. Examples of reactor systems that may be used for the biooxidizing 104 (and also for the treating 112) include constructed heaps of particulate mineral material, stirred tanks and vats. Constructed heaps are preferred reactor systems for both the biooxidizing 104 and the treating 112. Similarly, the leaching 120 and the leaching 128 may be performed in any system, such as in constructed heaps, stirred tanks or vats, with constructed heaps being preferred.

In heap processing, a structured pile, or heap, of particulate mineral material to be processed is constructed by depositing particles of the mineral material to a desired depth. The heap is typically constructed over a liquid impermeable liner and a liquid collection system. For example, when performing the biooxidation 104 in a heap operation, the feed of the biooxidation liquor 106 is typically applied to the top of the heap, such as by emission of the feed of the biooxidation liquor 106 from an irrigation system disposed over a top surface of the heap. The biooxidation liquor then percolates through the heap and the effluent of the biooxidation liquor 108 is collected through the liquid collection system. As one example, a heap of the first mineral material 102 in particulate form sized at minus ¾ inch (1.9 cm) might be constructed to a depth of 20 to 45 feet (6.1 to 13.7 meters), with application of the feed of the biooxidation liquor 106 to the top of the heap of a rate of from 0.001 to 0.005 gallons per square foot per minute (0.04 to 0.20 liters per square meter per minute) and continuing for a duration of from 150 days to 300 days.

To promote rapid commencement and progression of biooxidation reactions when the biooxidation 104 is conducted in a heap, it is preferred that the first mineral material 102 in particulate form is inoculated with one or more type of iron-oxidizing acidophilic microorganism before or while the mineral material is being deposited to form the heap. Some examples of such iron-oxidizing acidophilic microorganisms include *Acidithiobacillus ferrooxidans, Leptospirillum ferrooxidans, Sulfobacillus thermosulfidooxidans, Metallosphaera sedula* or *Acidianus brierleyi*. The inoculation may be accomplished, for example, by spraying the mineral material with an acidic aqueous sulfate solution containing the appropriate microorganism(s), along with appropriate nutrients for the microorganism(s). Additional information concerning inoculation during construction of a heap, and operation of a biooxidation process in a heap, is provided, for example, in U.S. Pat. No. 5,246,486, the entire contents of which are incorporated by reference herein as if set forth herein in full.

The second mineral material 114 may be any sulfidic mineral material that comprises gold locked in sulfide minerals, and that also comprises a significant content of acid-consuming mineral material. The second mineral material 114 may be, for example, in the form of a whole ore, a concentrate (such as may be prepared by flotation or another concentration operation), tailings from other mineral processing operations, a blend of ores, or a combination of materials including in any proportions any number of the foregoing with or without the presence also of other components. The second mineral material 114 typically is refractory to gold recovery due to all or a significant portion of the gold being locked in iron-containing sulfide minerals, such as for example one or more of pyrite, arsenopyrite, marcasite and pyrrhotite.

Although not required for all implementations of the invention, the second mineral material 114 will typically have a lower gold content, and particularly will often have a lower gold content, than the first mineral material 102. The gold content of the second mineral material 114, for example, will typically be no larger than 0.3 ounce per ton (10.3 grams per tonne), and more often no larger than 0.1 ounce per ton (3.4 grams per tonne). The gold content of the second mineral material 114 will, however, often be at least 0.01 once per ton (0.3 gram per tonne), and more often at least 0.03 once per ton (1.0 gram, per tonne).

The second mineral material 114 contains acid-consuming mineral material, which may be comprised of one or more different acid-consuming mineral components. Although not required for all implementations of the invention, the second mineral material 114 preferably comprises a larger acid-consuming mineral content than does the first mineral material 102. For example, the second mineral material 114 will in a preferred implementation have an acid-consuming capacity of larger than 80 pounds per ton (33 kilograms per tonne), or even larger than 300 pounds per ton (123.7 kilograms per tonne). Moreover, in a preferred implementation, the second mineral material 114 will often have a significant carbonate content, indicative of a high content of one or more acid-consuming carbonate minerals, such as for example calcite and/or dolomite. In this preferred implementation, the second mineral material 114 typically comprises a carbonate content of greater than 2.5 weight percent carbonate, preferably at least 3 weight percent carbonate more preferably at least 5 weight percent carbonate, and often at least 10 weight percent carbonate, or more. Also, although there is no practical upper limit to the carbonate content in the second mineral material 114, often the carbonate content of the second mineral material 114 is smaller than 25 weight percent carbonate.

Moreover, although not required for all implementations of the invention, the first mineral material 102 typically has an acid-consuming mineral content and a carbonate content that are each smaller than the corresponding content in the second mineral material 114. In an even more preferred implementation the first mineral material 102 has an acid-consuming mineral content and a carbonate content that are each smaller than one-half the corresponding content in the second mineral material 114. In a preferred implementation the treating 112 is continued until at least 10 weight percent, more preferably at least 20 weight percent, even more preferably at least 30 weight percent and still more preferably at least 40 weight percent, of the carbonate mineral content of the second mineral material 114 has been decomposed by reaction with acid in the treating solution. One significant aspect of the invention, however, is that it is not necessary to decompose all acid-consuming minerals in the second mineral material 114 in order to accomplish oxidation of sulfide sulfur to release gold from sulfide minerals. Although the treating 112 may be operated to effect decomposition of substantially all carbonate minerals, often 80 weight percent or less of the carbonate minerals may be oxidized during the treating 112.

The treating 112 is preferably continued until sufficient sulfide sulfur in the sulfide minerals of the second mineral material 114 has been oxidized so that an economically significant amount of gold is released for recovery. Often at least 20 weight percent, and more often at least 40 weight percent, of the sulfide sulfur in the second mineral material 114 is oxidized during the treating 112. In one preferred embodiment, at least 50 weight percent of the sulfide sulfur in the second mineral material 114 is oxidized during the treating 112. In many situations, however not more than 80 weight percent of sulfide sulfur contained in the sulfide minerals of the second mineral material 114 is oxidized during the treating 112.

Performing the treating 112 on the second mineral material 114 with the treating solution increases the gold extraction into the leach solution relative to no treatment. Gold extraction from the second sulfide mineral material 114 during leaching with a lixiviant for gold is typically enhanced by at least 10 percentage points, preferably by at least 20 percentage points, and frequently by at least 30 percentage points or more, following the treating 112 relative to direct leaching of the second mineral material 114 with the lixiviant without first performing the treating 112.

Typically, the treated effluent of the treating solution 116 will have a higher pH than the pH of the feed of the treating solution 110. In a preferred implementation, sufficient acid is neutralized and iron precipitated during the treating 112 so that the treated effluent of the treating solution 116 has a pH of at least pH 2.5, more preferably at least pH 3.5, and even more preferably at least pH 5.0. Also, the treated effluent of treating solution 116 will typically have a significantly smaller concentration of dissolved total iron than the feed of the treating solution 110. Preferably, the concentration of dissolved total iron in the treated effluent of the treating solution 116 is no larger than one-half the concentration in the feed of the treating solution 110. It is also preferred that the treating be operated so that the treated effluent of the treating solution 116 has a dissolved iron content of no larger than 5 grams per liter (and more preferably no larger than 1 gram per liter), with most and preferably substantially all of the dissolved iron being in the ferrous form. Also, as the treating 112 continues, acid-containing components of the second mineral material 114 are consumed, and at some point insufficient quantities of acid-containing components will remain to thereafter effectively neutralize acid in the treating solution, and the pH of the treated effluent of the treating solution 116 may begin to fall rapidly. In a preferred implementation, the treating 112 is discontinued when the pH of the treated effluent of the treating solution 116 is greater than pH 2.5, more preferably greater than pH 3.5 and still more preferably is greater than pH 5.0. The treated effluent of the treating solution 116 may be used as process water or disposed of or discharged if water quality is sufficiently high. Alternatively, the treated effluent of the treating solution 116 may be subjected to additional water treatment to further improve water quality prior to further use, disposal or discharge. In one embodiment, at least a portion of the treated effluent of the treating solution 116 is used, either with or without additional water treatment, to prepare the feed of the biooxidation liquor 106. For example, all or a portion of the treated effluent of the treating solution 116 may be combined with a portion of the effluent of the biooxidation liquor 108 for use to form the feed of the biooxidation liquor 106. One implementation of this option is shown in FIG. 1 by the optional recycle stream 134. Additional make-up liquid may also be added as needed.

Significant features of the invention concern transfer of iron and sulfur from one operation to another. In the embodiment shown in FIG. 1, during the biooxidation 104, at least some of the iron-containing sulfide minerals of the first mineral material 102 are decomposed, releasing iron and sulfur from the first mineral material 102. Much of the released iron and sulfur are dissolved in the biooxidation liquor, with the iron being present in solution primarily as dissolved ferric iron and the sulfur being present in solution primarily in the sulfate group. With continued reference to the embodiment of FIG. 1, at least a portion of each of the iron and sulfur in the effluent of the biooxidation liquor 108 are transferred from the biooxidation 104 to the treating 112 in the feed of the treating solution 110. During the treating 112, significant quantities of dissolved iron and some of the dissolved sulfur transferred from the biooxidizing 104 are then precipitated, as acid in the treating solution is neutralized and the pH of the treating solution increases. In a preferred implementation the quantity of iron precipitated from the treating solution during the treating 112 is at least 20 pounds of iron per ton of the second mineral material 114 (9.1 kg of iron per tonne of the second mineral material 114) and more preferably at least 40 pounds of iron per ton of the second mineral material 114 (18.2 kg of iron per tonne of the second mineral material 114).

Although the treating 112 may be performed in a variety of reactor systems under a variety of conditions, in a preferred implementation the treating 112 is performed in a heap operation. As one example, the treating 112 may be performed in a heap of the second mineral material 114 in particulate form sized at minus ¾ inch (1.9 cm) constructed to a depth of from 5 to 45 feet (1.5 to 13.7 meters), with application of the feed of the treating solution 110 to the top of the heap at a rate of from 0.001 to 0.005 gallons per square foot per minute (0.04 to 0.20 liters per square meter per minute) and continuing for a duration of from 100 to 300 days.

The method of the present invention as described above provides an advantage of efficiently treating two different gold-bearing mineral materials to enhance gold recovery from both. This aspect of the invention can advantageously be applied, for example, at a mine that produces two or more different kinds of ores, one of which contains too high of an acid-consuming mineral content to be economically treatable by biooxidation, and one of which is amenable to biooxidation. In a variation, however, the first mineral material 102 that is subjected to the biooxidizing 104 is not a gold-containing mineral material. Rather the first mineral material 102 may contain some other recoverable metal value contained in sulfide minerals that are decomposed during the biooxidizing 104. For example, the first mineral material may contain a nonferrous base metal value, such as comprising one or more of copper, nickel, zinc and cobalt, contained in sulfide minerals that are decomposed during the biooxidizing 104. By nonferrous base metal, it is meant a base metal other than iron.

In one aspect of the invention, the invention may involve use of a second mineral material having a significant acid-consuming capacity for water treatment of biooxidation liquor effluent from biooxidizing a first mineral material, with or without recovery of gold or other metal values from the second mineral material. One conventional technique for treating biooxidation liquor effluent is to treat all or a portion of the effluent with a reagent, such as lime, for neutralization and precipitation of dissolved metals. Sludge resulting from precipitation of dissolved metals is disposed in mine tailings. The resulting neutralized solution is recycled for use as process water or disposed of in tailing ponds. The invention provides a water treatment option that may be used as an alternative or supplement to other water treatment techniques.

Figure 2:
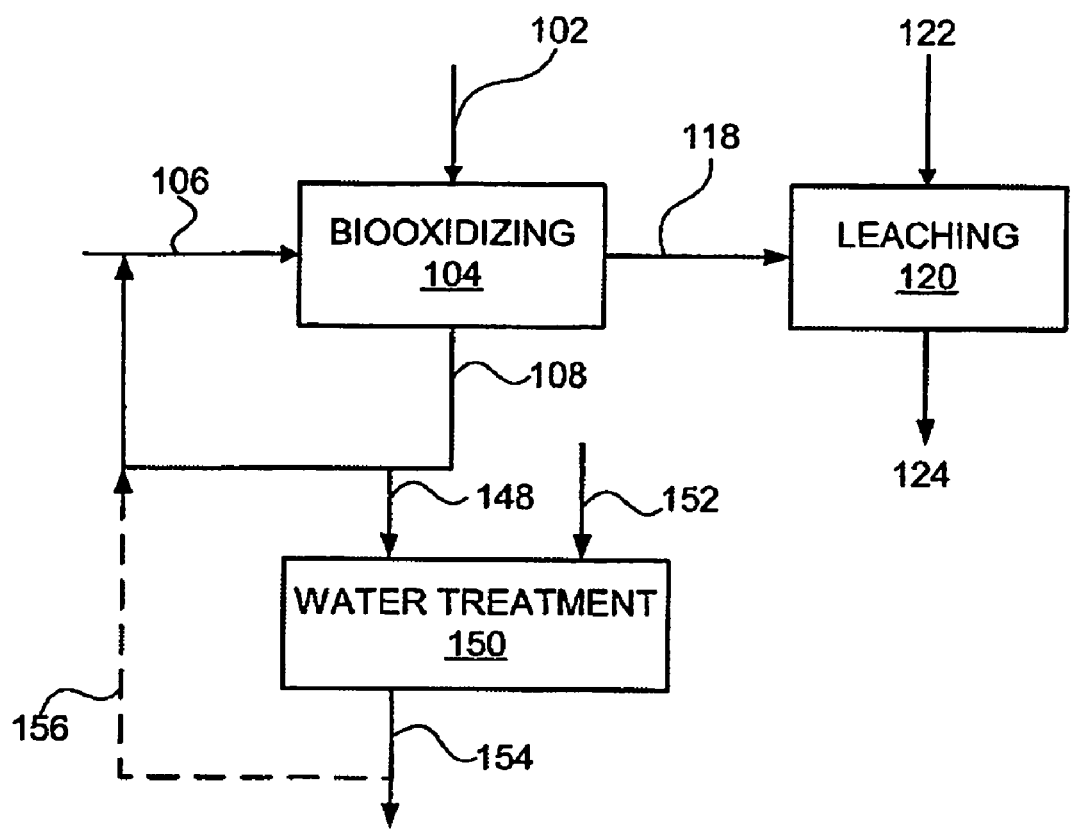
FIG. 2 is a generalized process block diagram illustrating another embodiment for implementation of the invention.

Referring now to FIG. 2, a generalized process block diagram is shown for one embodiment for implementation of the invention involving use of a second mineral material for treatment of biooxidation liquor effluent from biooxidation of a first mineral material. The embodiment of FIG. 2 includes the same biooxidizing 104 and leaching 120 steps as shown in FIG. 1, and described previously. As shown in FIG. 2, the first mineral material 102 is subjected to the biooxidizing 104, during which the first mineral material 102 is contracted with the acidic biooxidation liquor. The residual solids 118 resulting from the biooxidizing 104 are subjected to the leaching 120 for extraction of gold. All or a portion of the effluent of the biooxidation liquor 108 is sent to water treatment 150 as aqueous feed solution 148. During the water treatment 150, the portion of the effluent of the biooxidation liquor 108 contained in the aqueous feed solution 148 is contacted with a second mineral material 152. The second mineral material 152 has a significant acid-consuming capacity due to the presence in the second mineral material 152 of acid-consuming mineral content, for example acid-consuming carbonate minerals such as calcite and/or dolomite. During the water treatment 150, acid in the aqueous feed solution 148 reacts with acid-consuming components of the second mineral material 152, thereby neutralizing at least a portion, and preferably a majority or even substantially all, of the acid content originally present in the aqueous feed solution 148. With such acid neutralization, the pH of the solution increases during the water treatment 150, resulting in reduced solubility and precipitation of metals originally dissolved in the aqueous feed solution 148. Treated aqueous effluent 154 from the water treatment 150 preferably has a higher pH and lower dissolved metal content than the aqueous feed solution 148. Optionally, all or a portion of the treated aqueous effluent 154 is used to prepare the feed of the biooxidation liquor 106 for use during the biooxidizing 104. One implementation of this optional feature is shown in FIG. 2 by the optional recycle stream 156. As another option, all or a portion of the treated aqueous effluent 154 may be further used as process water, or disposed of or discharged, depending upon the water quality of the treated aqueous effluent 154 and operational needs. In yet a further option, all or a portion of the treated aqueous effluent 154 may be subjected to additional water treatment to further improve water quality to a desired level for reuse as process water in operations, or for disposal or discharge.

As noted, the embodiment of the invention shown in FIG. 2 includes the biooxidizing 104 and the leaching 120 steps that are also included in the embodiment shown in FIG. 1. All of the previous discussions concerning those steps (including discussions concerning the first mineral material 102, the feed of the biooxidation liquor 106, the effluent of the biooxidation liquor 108, the residual solids 118, the feed of the leach solution 122, and the effluent of the leach solution 124) apply equally for the embodiment of FIG. 2.

The water treatment 150 is preferably operated so that the treated aqueous effluent 154 has a higher pH and a lower dissolved metal content than the effluent of the biooxidation liquor 108 supplied as feed to the water treatment 150 as the aqueous feed solution 148. The water treatment 150 may be operated substantially as described previously with respect to operation of the treating 112 of the embodiment shown in FIG. 1, except that (unlike the second mineral material 114 of FIG. 1) the second mineral material 152 need not contain gold. In one implementation, however, the second mineral material 152 may comprise some metal value that is contained in sulfide minerals and that is of interest for recovery. The metal value may comprise gold locked in sulfide minerals, as previously described with FIG. 1. Alternatively, the metal value may comprise a valuable nonferrous base metal contained in sulfide minerals (such as for example, one or more of copper, nickel, zinc, and cobalt) and at least a portion of such base metal is released for recovery as sulfide minerals are decomposed during the water treatment 150. In the case of such base metal values, the released base metal may to some degree dissolve into the aqueous liquid being treated and the dissolved base metal values may be recovered from the treated aqueous effluent. Alternatively, such base metal values may not dissolve into the liquid or if dissolved may partially or wholly precipitate, and a subsequent leach may be performed to dissolve and recover the released base metal values.

EXAMPLES

Example 1

Biooxidation Liquor Treatment, Dolomitic Ore

A column of ore from the Newmont Mining Corporation Post Deposit near Carlin, Nev., U.S.A., is prepared for testing. The ore contains carbonate in the mineral dolomite. The ore is crushed to 100% minus ¾ inch (1.9 cm), and a 44.45 kg sample of the crushed ore is loaded into a column having an inside diameter of about 8 inches (20.32 centimeters). Fifty-five liters of aqueous acidic ferric-iron bacterial culture, with characteristics of biooxidation liquor, is percolated through the ore sample in the column. Table 1 summarizes results of the test.

TABLE 1

| Parameter | Ore Characteristics | | Comments |
| | Ore Head Prior to Treatment | Ore Residue Following Treatment | |
| --- | --- | --- | --- |
| Carbonate, wt % | 14.75 | 11.30 | 23.4% dissolution of carbonate |
| Sulfide Sulfur, wt % | 1.48 | 0.58 | 60.8% oxidation of sulfide sulfur |
| Total Fe, wt % | 1.62 | 3.47 | 2.14× increase in iron content |

The iron content of the biooxidation culture added to the column varies from 15 to 25 g/L. The column effluent generally contains <0.2 g/L iron. Based on iron assay of the ore, the column retains an equivalent of 39.9 pounds of iron/ton of ore (19.95 kg of iron/tonne of ore) treating 296.5 gallons of solution per ton of ore (1,122.4 liters of solution per tonne of ore). This dolomitic ore proved effective for precipitation of iron from solution and for oxidation of sulfide sulfur in the ore sample.

Example 2

Biooxidation Liquor Treatment, Calcitic Ore

Another column of ore from the Newmont Mining Corporation Post Deposit near Carlin, Nev., U.S.A., is prepared for testing. For this test, carbonate is present in the ore in the mineral calcite. The ore is crushed to 100% minus ¾ (1.9 cm) inch and a 49 kg sample of the crushed ore is loaded into the column. Fifty-seven liters of aqueous acidic ferric-iron bacterial culture, with characteristics of biooxidation liquor, is percolated through the column. Table 2 summarizes results of the test.

TABLE 2

| Parameter | Ore Characteristics | | Comments |
| | Ore Head Prior to Treatment | Ore Residue Following Treatment | |
| --- | --- | --- | --- |
| Carbonate, wt % | 15.50 | 9.15 | 41.0% dissolution of carbonate |
| Sulfide sulfur, wt % | 0.44 | 0.20 | 54.5% oxidation sulfide sulfur |
| Total Fe, wt % | 1.03 | 3.95 | 3.03× increase in iron content |

The iron content of the biooxidation culture added to the column varies from 15 to 25 g/L. The column effluent generally contains substantially no dissolved iron. Based on iron assay of the ore, the column retains an equivalent of 58.8 pounds of iron/ton of ore (29.4 kg of iron/tonne of ore) treating 278.9 gallons of solution per ton of ore (1055.7 liters of solution per tonne of ore). This calcitic ore also proved effective for iron precipitation and oxidation of sulfide sulur in the ore sample. Also, there is no indication that the amount of solution treated had reached a maximum at the time of termination of this test.

Example 3

Gold Recovery Following Biooxidation Liquor Treatment, Dolomitic Ore

The ore from the column from Example 1 is tested for gold recovery. Ore from the column is ground to 72 weight percent minus 200 mesh (74 microns), and gold is then leached from the ore in a laboratory bottle roll carbon-in-leach. The gold content of the ore sample prior to the cyanide leach is 0.044 ounce per ton (1.5 grams per tonne). The gold extraction from the ore sample following treatment with the biooxidation culture solution is compared to analytical baseline gold extraction from untreated ore. Gold leach results are summarized in Table 3.

TABLE 3

Ore Characteristics
Gold Extraction Following Solution Treatment

| Parameter | Gold Extraction, % |
|---|---|
| Analytical baseline extraction | 15.9 |
| Bottle roll CIL, following treatment with biooxidation culture solution | 57.5 |

The data show improved gold recovery from 15.9% to 57.5% following treatment of the ore with the biooxidation culture solution. The ferric iron in the solution oxidized the pyrite occluding the gold values. Oxidation is possible even as the ferric iron is precipitated during contact with the carbonate in the ore.

Example 4

Effect Of Carbonate Content

A comparative test is performed to evaluate the effect of increasing carbonate content on gold recovery from refractory sulfidic ores. Sulfidic gold ore is blended to provide composite ore samples with carbonate contents of 0.85, 1.45, 2.4, 4, 5.25, 6.75 and 7.45 weight percent, with approximately constant gold content ranging from 0.060 to 0.067 ounces per ton (2.1 to 2.3 grams per tonne), and with approximately constant sulfide sulfur content ranging from 1.34 to 1.43 weight percent. Columns containing 100 pounds (45.4 kg) of respective ore composite samples are treated with biooxidation liquor. The biooxidation liquor has a pH of 2.3, an oxidation potential of +666 mV (SCE) and an iron concentration of about 9 g Fe/L, with almost all of the iron in the oxidized ferric species. The biooxidation liquor is percolated through each column at an initial rate of 0.005 gal/min-ft$^2$ (0.20 L/min-m$^2$). Later, the solution flow rate is reduced to 0.002 gal/min-ft$^2$ (0.08 L/min-m$^2$). Column testing lasts for a period of 100 days.

Ore composite samples containing initial carbonate contents of 0.85, 1.45 and 2.4 weight percent consume little iron and are readily acidified to pH 3 and less. Ore composite samples with higher initial carbonate content (4, 5.25, 6.75, and 7.45 weight percent) tend to consume more iron and acid, with column effluent solution remaining at a pH 3 or higher throughout the test.

Figure 3:
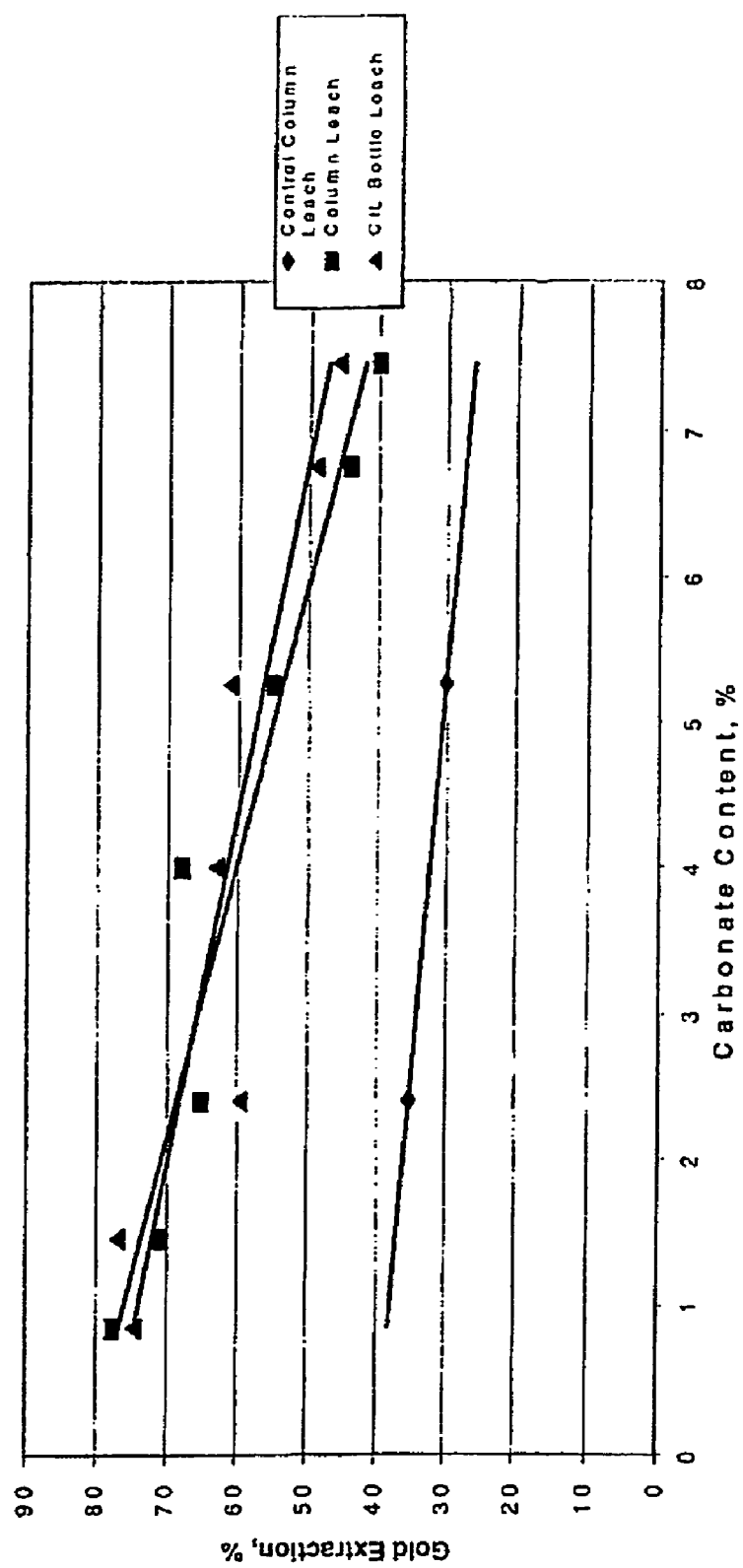
FIG. 3 is a graph of gold extraction vs. carbonate content for gold extraction tests discussed in Example 4.

Following treatment with the biooxidation liquor, the solid residues of the composite ore samples are then leached using cyanide either in the column, simulating a heap leach scenario, or in carbon-in-leach bottle roll tests after pulverizing the composite ore sample, to simulate milling following biooxidation of sulfides. Following the cyanide leach, the leached solid residues are analyzed for gold content in order to determine the extent of gold extraction. The gold extraction results are illustrated graphically in FIG. 3. FIG. 3 also shows gold extraction from control column leaching tests of two of the composite ore samples (2.4 and 5.25% carbonate) in which the composite ore samples are directly leached without first treating the samples with biooxidation liquor.

The foregoing discussion of the invention has been presented for purposes of illustration and description. The foregoing is not intended to limit the invention to only the form or forms specifically disclosed herein. Although the description of the invention has included description of one or more embodiments and certain variations and modifications, other variations and modifications are within the scope of the invention, e.g., as may be within the skill and knowledge of those in the art after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter. Furthermore, any feature described with respect to any disclosed embodiment may be combined in any combination with one or more features of any other embodiment or embodiments. For example, additional processing steps can be included at any point before, during or after processing disclosed in any of the process embodiments described herein or shown in any of the figures, so long as the additional steps are not incompatible with the disclosed processing according to the present invention. Moreover, processing steps disclosed in any of the process embodiments described herein can be combined with any other processing steps described with any other process embodiment.

The terms "comprising, "containing, "including, and "having," and variations thereof, are intended to be non-limiting in that the use of such terms indicates the presence of some condition or feature, but not to the exclusion of the presence of any other condition or feature. Percentages stated herein are by weight unless otherwise expressly stated.

What is claimed is:

1. A method for processing iron-containing, sulfidic mineral materials comprising gold contained in sulfide minerals, the method comprising:
   biooxidizing first said mineral material in the presence of biooxidation liquor, the biooxidizing comprising:
   (i) decomposing at least a portion of the sulfide minerals of the first said mineral material through microbial action, thereby releasing first gold from the sulfide minerals of the first said mineral material; and
   (ii) generating acidic effluent of the biooxidation liquor having a pH of smaller than pH 2.5 and comprising dissolved ferric iron;
   treating second said mineral material, which is different than the first said mineral material, with treating liquid, the second said mineral material comprising acid-consuming mineral content, and feed of the treating liquid supplied to the treating comprising at least a portion of the effluent of the biooxidation liquor and having a pH of smaller than pH 2.5, the treating comprising:
   (i) decomposing at least a portion of the sulfide minerals of the second said mineral material, thereby releasing second gold from the sulfide minerals of the second said mineral material;
   (ii) reacting acid of the treating liquid with the acid-consuming mineral content of the second said mineral material, thereby at least partially neutralizing the acid; and
   (iii) precipitating iron from the treating liquid;
   (iv) removing from the treating a treated effluent of the treating liquid, the treated effluent having a pH that is higher than the pH of the feed of the treating liquid;
   after the biooxidizing, leaching solid residue of the biooxidizing with a first leach solution and dissolving at least a portion of the first gold into the first leach solution; and
   discontinuing the treating when the pH of the treated effluent is greater than pH 3.5 and after the discontinuing of the treating, leaching solid residue of the treating with a second leach solution and dissolving from the solid residue of the treating at least a portion of the second gold into the second leach solution.

2. The method of claim 1, wherein each of the effluent of the biooxidation liquor and the feed of the treating liquid has a pH in a range of from pH 1.0 to pH 2.0.

3. The method of claim 1, wherein each of the effluent of the biooxidation liquor and the feed of the treating liquid comprises a dissolved ferric iron concentration of at least 5 g/L.

4. The method of claim 3, wherein the dissolved ferric iron concentration in each of the effluent of the biooxidation liquor and the feed of the treating liquid is in a range of from 5 to 70 g/L.

5. The method of claim 4, wherein dissolved total iron concentration in the treated effluent is no larger than one-half the concentration of dissolved ferric iron concentration in the feed of the treating liquid.

6. The method of claim 5, wherein the dissolved total iron concentration in the treated effluent of the treating liquid is no larger than 1 g/L.

7. The method of claim 1, wherein the effluent of the biooxidation liquor has an oxidation potential of at least +500 mV, as measured relative to a silver/silver chloride electrode.

8. The method of claim 1, wherein the acid-consuming mineral content comprises carbonate mineral content.

9. The method of claim 8, wherein the carbonate mineral content includes at least one member selected from the group consisting of calcite, dolomite and combinations thereof.

10. The method of claim 8, wherein the first said mineral material has a carbonate content that is smaller than the carbonate content of the second said mineral material.

11. The method of claim 10, wherein the carbonate content of the second said mineral material is larger than 2.5 weight percent.

12. The method of claim 10, wherein the carbonate content of the second said mineral material is at least 3 weight percent.

13. The method of claim 10, wherein the carbonate content of the second said mineral material is at least 5 weight percent.

14. The method of claim 10, wherein the carbonate content of the second said mineral material is at least 10 weight percent.

15. The method claim 1, wherein the treating comprises applying the feed of the treating liquid to and removing the treated effluent of the treating liquid from a heap initially comprising the second said mineral material.

16. The method of claim 15, wherein the heap is a first heap and the biooxidizing comprises applying feed of the biooxidation liquor to and removing the effluent of the biooxidation liquor from a second heap, different than the first heap, initially comprising the first said mineral material.

17. The method of claim 1, wherein the treating comprises oxidizing at least 20 percent of sulfide sulfur of the second said mineral material.

18. The method of claim 17, wherein the acid-consuming mineral content of the second said mineral material comprises carbonate mineral content; and
the treating comprises decomposing at least 20 weight percent of the carbonate minerals in the second said mineral material.

19. The method of claim 18, wherein the treating compromises decomposing at least 40 weight percent of the carbonate minerals in the second said mineral material.

20. The method claim 18, wherein the treating comprises decomposing from 20 weight percent to 80 weight percent of the carbonate minerals in the second said mineral material.

21. The method of claim 1, wherein the treating comprises oxidizing at least 40 percent of sulfide sulfur in the second said mineral material.

22. The method of claim 1, wherein the first leach solution and the second leach solution each comprises a lixiviant for gold, each said lixiviant being independently selected from the group consisting of cyanide lixiviants, thiosulfate lixiviants, thiocyanate lixiviants and combinations thereof.

23. The method of claim 1, comprising:
after the first leaching, removing at least a portion of the first gold from the first leach solution; and
after the second leaching, removing at least a portion of the second gold from the second leach solution.

24. The method of claim 1, wherein the sulfide minerals comprise a member selected from the group consisting of pyrite, marcasite, pyrrhotite, arsenopyrite and a combination thereof.

25. The method of claim 1, wherein the second said mineral material comprises a gold content of from 0.03 to 0.1 ounce per ton.

26. The method of claim 1, wherein during the second leaching, gold extraction into the second leach solution is at least 10 percentage points higher than a base gold extraction if the second mineral material were instead directly leached with the second leach solution.

27. The method of claim 1, wherein during the second leaching, gold extraction into the second leach solution is at least 20 percentage points higher than a base gold extraction if the second mineral material were instead directly leached with the second leach solution.

28. The method of claim 1, wherein:
the second said mineral material has a carbonate content of at least 2.5 weight percent and that is larger than a carbonate content of the first said mineral material;
the effluent of the biooxidation liquor and feed of the treating liquid each has a pH in a range of from pH 1.0 to pH 2.0 and each comprises a dissolved ferric iron concentration in a range of from 5 to 70 g/L;
the biooxidizing comprises oxidizing at least 20 percent of sulfide sulfur in the first said mineral material; and
the treating comprises oxidizing at least 20 percent of sulfide sulfur in the second said mineral material and decomposing at least 20 weight percent of carbonate minerals in the second said mineral material.

29. The method of claim 1, wherein:
the biooxidizing comprises dissolving iron from the first said mineral material into the biooxidation liquor; and
the treating comprises precipitating iron from the treating liquid in an amount of at least 20 pounds of iron per ton of the second said mineral material.

30. The method of claim 1, wherein:
the treated effluent of the treating liquid has a pH that is higher than the pH of the feed of the treating liquid; and
the treated effluent of the treating liquid has a dissolved total iron concentration that is smaller than the dissolved ferric iron concentration of the feed of the treating liquid.

31. The method of claim 1, wherein the second said mineral material has an acid-consuming capacity of larger than 80 pounds per ton.

32. A method for processing a gold-containing, first sulfidic mineral material comprising gold contained in iron-containing sulfide minerals and further comprising acid-consuming carbonate minerals, the method comprising:
treating the first sulfidic mineral material with an acidic treating liquid;

wherein feed of the treating liquid supplied to the treating has a pH of smaller than pH 2.5, comprises a concentration of dissolved ferric iron of at least 5 g/L and comprises effluent of biooxidation liquor from biooxidation of a second sulfidic mineral material that is different than the first sulfidic mineral material;

the treating comprising reacting acid in the treating liquid with the carbonate minerals of the first sulfidic mineral material, thereby at least partially neutralizing the acid and raising the pH of the treating liquid;

the treating further comprising reducing at least a portion of the ferric iron and oxidizing at least a portion of sulfide sulfur of the sulfide minerals of the first sulfidic mineral material, thereby decomposing at least a portion of the sulfide minerals of the first sulfidic mineral material;

removing from the treating a treated effluent of the treating liquid, the treated effluent having a pH that is higher than the pH of the feed of the treating liquid;

discontinuing the treating when the pH of the treated effluent is greater than pH 3.5; and after the discontinuing of the treating, leaching residual solids of the treating with a leach solution to dissolve from the residual solids at least a portion of the gold of the first sulfidic mineral material into the leach solution.

33. The method of claim 32, wherein the treating comprises oxidizing at least 20 percent of the sulfide sulfur in the first sulfidic mineral material and decomposing at least 20 weight percent of the carbonate minerals in the first sulfidic mineral material.

34. The method of claim 32, comprising collecting treated effluent liquid from the treating, the treated effluent liquid having a dissolved total iron concentration of smaller than 1 g/L.

35. The method of claim 32, wherein the treating comprises precipitating iron from the treating liquid in an amount of at least 20 pounds of iron per ton of the first sulfidic mineral material.

36. The method of claim 32, wherein the treating is performed in a heap and the iron that precipitates during the treating is precipitated in the heap.

37. The method of claim 32, further comprising, after the leaching removing from the leach solution at least a portion of the gold that dissolved in the leach solution during the leaching.

38. The method of claim 32, wherein the first sulfidic mineral material comprises a gold content of from 0.03 to 0.1 ounce per ton.

39. A method for processing first sulfidic mineral material comprising a nonferrous base metal contained in sulfide minerals and comprising acid-consuming carbonate minerals, the first sulfidic mineral material having a carbonate content of at least 2.5 weight percent, the method comprising:

treating the first sulfidic mineral material with an acidic treating liquid;

wherein feed of the treating liquid supplied to the treating has a pH of no larger than pH 2.5, comprises a dissolved ferric iron concentration of at least 5 g/L and comprises effluent of biooxidation liquor from biooxidation of a second sulfidic mineral material that is different than the first sulfidic mineral material;

the treating comprising reacting acid in the treating liquid with the carbonate minerals of the first sulfidic mineral material, thereby at least partially neutralizing the acid and raising the pH of the treating liquid;

the treating further comprising reducing at least a portion of the ferric iron and oxidizing at least a portion of sulfide sulfur of the sulfide minerals of the first sulfidic mineral material, thereby decomposing at least a portion of the sulfide minerals of the first sulfidic mineral material and releasing at least a portion of the nonferrous base metal;

removing from the treating a treated effluent of the treating liquid, the treated effluent having a pH that is higher than the pH of the feed of the treating liquid;

discontinuing the treating when the pH of the treated effluent is greater than pH 3.5; and dissolving at least a portion of the nonferrous base metal released from the of the first sulfidic mineral material mineral material into a leach solution selected from the group consisting of the treating liquid and a leach liquid other than the treating liquid.

40. The method of claim 39, wherein the first sulfidic mineral material has an acid-consuming capacity of larger than 80 pounds per ton.

41. The method of claim 39, wherein the carbonate content of the first sulfidic mineral material is at least 5 weight percent.

42. The method of claim 39, wherein the carbonate content of the first sulfidic mineral material is at least 10 weight percent.

43. The method of claim 39, wherein the treating comprises decomposing at least 20 weight percent of the carbonate minerals in the first sulfidic mineral material.

44. The method of claim 39, wherein the treating comprises oxidizing at least 20 percent of the sulfide sulfur in the first sulfidic mineral material.

45. The method of claim 39, wherein the treating comprises:

oxidizing at least 40 percent of the sulfide sulfur in the first sulfidic mineral material; and decomposing at least 40 weight percent of the carbonate minerals in the first sulfidic mineral material.

46. The method of claim 39, wherein the leach solution is the treating liquid, and the treating comprises the dissolving.

47. The method of claim 39, wherein the pH of the feed of the treating liquid is in a range of from pH 1.0 to pH 2.0 and the dissolved ferric iron concentration in the feed of the treating liquid is in a range of from 5 to 70 g/L.

48. The method of claim 39, wherein the treating comprises precipitating iron from the treating liquid in an amount of at least 20 pounds of iron per ton of the first sulfidic mineral material.

49. The method of claim 39, wherein the nonferrous base metal comprises copper.

50. The method of claim 39, wherein the nonferrous base metal comprises nickel.

51. The method of claim 39, wherein the nonferrous base metal comprises zinc.

52. The method of claim 39, wherein the nonferrous base metal comprises cobalt.

53. The method of claim 28, wherein:

the biooxidizing comprises dissolving iron from the first said mineral material into the biooxidation liquor; and the treating comprises precipitating iron from the treating liquid in an amount of at least 20 pounds of iron per ton of the second said mineral material.

54. The method of claim 53, wherein the treating comprises applying the feed of the treating liquid to and removing the treated effluent from a heap initially comprising the second said mineral material.

55. The method of claim 54, wherein the heap is a first heap and the biooxidizing comprises applying feed of the biooxidation liquor to and removing the effluent of the biooxidation liquor from a second heap, different than the first heap, initially comprising the first said mineral material.

56. The method of claim 54, comprising discontinuing the treating when the pH of the treated effluent is greater than pH 5.0.

57. The method of claim 54, wherein the first said mineral material has a gold content of at least 0.3 ounce per ton and the second said mineral material has a gold content of no larger than 0.1 ounce per ton.

58. The method of claim 1, comprising discontinuing the treating when the pH of the treated effluent is greater than pH 5.0.

59. The method of claim 32, comprising discontinuing the treating when the pH of the treated effluent is greater than pH 5.0.

60. The method of claim 39, comprising discontinuing the treating when the pH of the treated effluent is greater than pH 5.0.

* * * * *

UNITED STATES PATENT AND TRADEMARK OFFICE
CERTIFICATE OF CORRECTION

PATENT NO.         : 7,514,050 B2
APPLICATION NO. : 11/146250
DATED                : April 7, 2009
INVENTOR(S)       : Brierley et al.

It is certified that error appears in the above-identified patent and that said Letters Patent is hereby corrected as shown below:

Column 20, line 14, delete "the of"; and
Column 20, line 15, delete "mineral material".

Signed and Sealed this

Sixteenth Day of June, 2009

JOHN DOLL
*Acting Director of the United States Patent and Trademark Office*